US012529252B2

(12) United States Patent
Thompson

(10) Patent No.: US 12,529,252 B2
(45) Date of Patent: Jan. 20, 2026

(54) METHOD OF INSTALLING A MODULAR HINGE

(71) Applicant: ASSA ABLOY Accessories and Door Controls Group, Inc., Monroe, NC (US)

(72) Inventor: Douglas R. Thompson, Somerset, PA (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 114 days.

(21) Appl. No.: 18/508,349

(22) Filed: Nov. 14, 2023

(65) Prior Publication Data

US 2025/0154810 A1 May 15, 2025

Related U.S. Application Data

(63) Continuation of application No. 17/574,056, filed on Jan. 12, 2022, now abandoned.

(60) Provisional application No. 63/151,432, filed on Feb. 19, 2021, provisional application No. 63/137,397, filed on Jan. 14, 2021.

(51) Int. Cl.
*E05D 7/02* (2006.01)

(52) U.S. Cl.
CPC .................................... *E05D 7/02* (2013.01)

(58) Field of Classification Search
CPC ....... E05D 7/02; E05D 3/122; E05D 11/0054; E05D 11/0009; Y10T 29/24; Y10T 29/49826; Y10T 29/4984; Y10T 29/4987
USPC .................................... 29/11, 428, 434, 450
See application file for complete search history.

(56) References Cited

U.S. PATENT DOCUMENTS

| | | | |
|---|---|---|---|
| 568,504 | A | 9/1896 | Volk |
| 2,048,380 | A | 7/1936 | Hansen |
| 3,402,422 | A | 9/1968 | Baer |
| 3,838,234 | A | 9/1974 | Peterson |

(Continued)

FOREIGN PATENT DOCUMENTS

| | | | |
|---|---|---|---|
| CA | 2505297 | A1 | 10/2006 |

OTHER PUBLICATIONS

Architectural Builders Hardware Manufacturing, Inc., Aluminum Continuous Geared Hinges, 2014, 22 pages.

(Continued)

*Primary Examiner* — Sarang Afzali
*Assistant Examiner* — Darrell C Ford
(74) *Attorney, Agent, or Firm* — Moore & Van Allen PLLC; Jeffrey R. Gray

(57) ABSTRACT

A split hinge made of a first hinge portion having a first cover that is operatively coupled to two first leaves, and a second hinge portion having a second cover that is operatively coupled to two second leaves. The first leaves, the second leaves, the first cover, and/or the second cover may have the same or different lengths. The first leaves may have first leaf lengths that are greater than or less than the first cover, while the second leaves may have second leaf lengths that are greater than or less than the second cover. The first cover may extend over the first leaves, the second cover may extend over the second leaves, and a portion of the first cover may extend over a portion of the second leaves or a portion of the second cover may extend over a portion of the first leaves to form the split hinge.

20 Claims, 17 Drawing Sheets

(56) References Cited

U.S. PATENT DOCUMENTS

| | | | | |
|---|---|---|---|---|
| 4,864,688 | A | 9/1989 | Gerber | |
| 4,999,878 | A | 3/1991 | Baer | |
| 4,999,879 | A | 3/1991 | Baer | |
| 5,062,181 | A | 11/1991 | Bobrowski et al. | |
| 5,685,045 | A * | 11/1997 | Lace | E06B 5/164 16/354 |
| 5,778,491 | A | 7/1998 | Baer | |
| 5,890,266 | A | 4/1999 | Herold | |
| 5,991,975 | A | 11/1999 | Baer | |
| 6,073,310 | A | 6/2000 | Baer | |
| 6,732,409 | B2 | 5/2004 | Baer | |
| 6,735,823 | B2 | 5/2004 | Pelletier | |
| 6,928,713 | B2 | 8/2005 | Baer | |
| 7,063,042 | B2 | 6/2006 | Dillingham | |
| 7,406,748 | B2 | 8/2008 | Baer | |
| 7,650,670 | B2 * | 1/2010 | Baer | E05D 7/04 16/236 |
| 9,097,046 | B2 * | 8/2015 | Baer | E05D 11/0054 |
| 9,428,946 | B2 | 8/2016 | Martinez Garcia et al. | |
| 10,125,527 | B2 | 11/2018 | Smalls | |
| 10,385,598 | B2 | 8/2019 | Shah et al. | |
| 2007/0151164 | A1 | 7/2007 | Marshall | |
| 2008/0295287 | A1 | 12/2008 | Hetherington | |
| 2014/0298616 | A1 * | 10/2014 | Baer | E05D 11/0054 16/250 |
| 2015/0122827 | A1 * | 5/2015 | Smith | B65D 25/32 220/592.2 |
| 2017/0192467 | A1 | 7/2017 | Holung et al. | |
| 2019/0203511 | A1 | 7/2019 | Shah | |
| 2022/0220785 | A1 * | 7/2022 | Thompson | E05D 7/009 |
| 2022/0290489 | A1 * | 9/2022 | Brown | E06B 7/23 |

OTHER PUBLICATIONS

Architectural Builders Hardware Manufacturing, Inc., Stainless Steel Hinge Welded Hospital Tip, 1 page.

Architectural Builders Hardware Manufacturing, Inc., Advanced Hospital Tip Full Concealed, 1 page.

ASSA ABLOY Accessories and Door Controls Group, Inc., International Patent Application No. PCT/US2022/012156, International Search Report and Written Opinion, Apr. 7, 2022.

ASSA ABLOY Accessories and Door Controls Group, Inc., International Patent Application No. PCT/US2022/012156, International Preliminary Report on Patentability, Jul. 27, 2023.

* cited by examiner

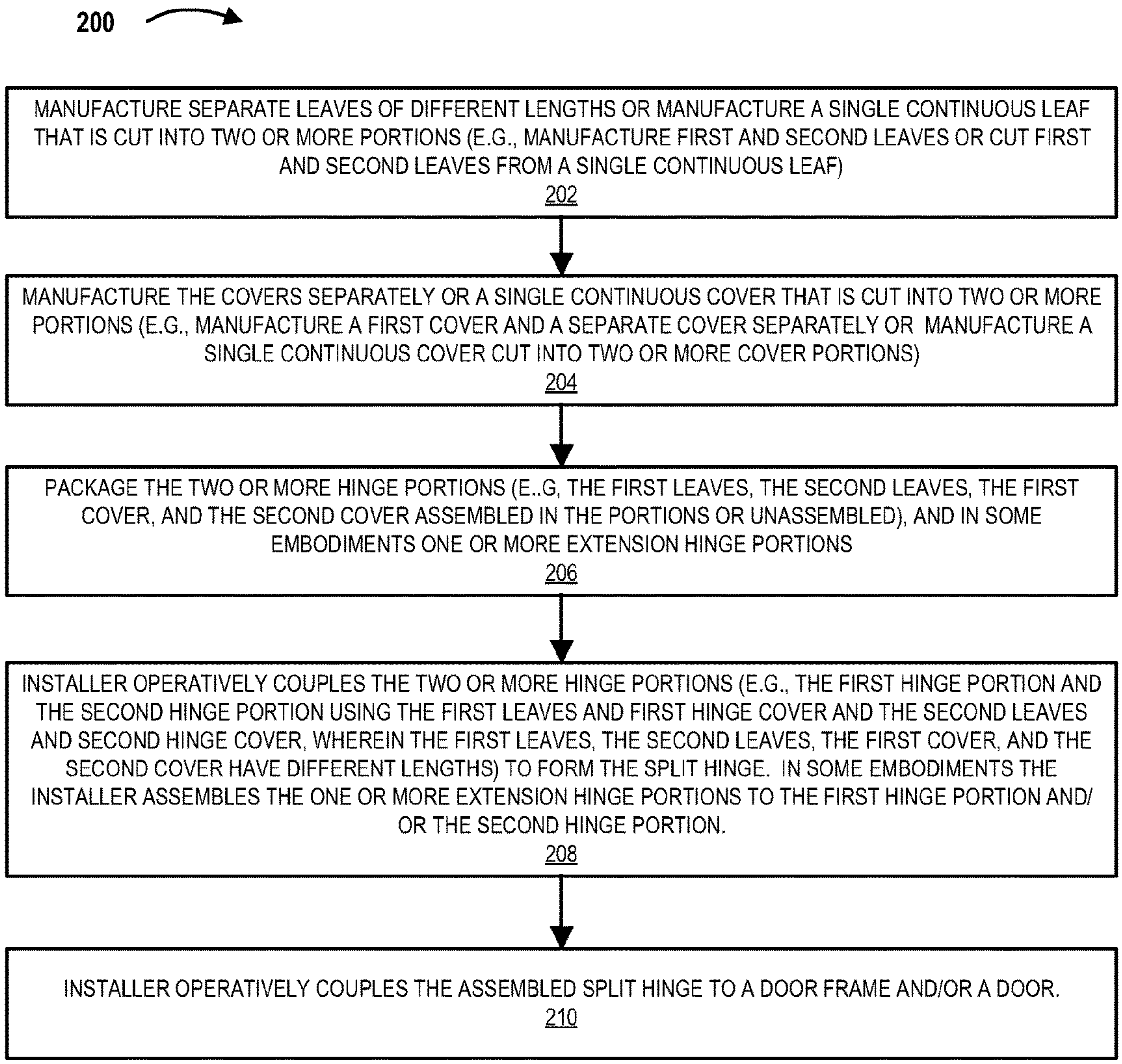
*FIG.* 15

METHOD OF INSTALLING A MODULAR HINGE

CROSS REFERENCE AND PRIORITY CLAIM UNDER 35 U.S.C. § 119

The present Application for a Patent is a continuation of and claims priority to U.S. patent application Ser. No. 17/574,056 entitled "SPLIT HINGE" filed on Jan. 12, 2022, which claims priority to U.S. Provisional Application No. 63/137,397 entitled "Split Hinge" filed on Jan. 14, 2021 and U.S. Provisional Application No. 63/151,432 entitled "Split Hinge" filed on Feb. 19, 2021, each of which are assigned to the assignee hereof and incorporated by reference herein in their entirety.

FIELD

The present disclosure generally relates to continuous hinges, and in particular a split hinge that allows for improved manufacturing, delivery, and assembly of the continuous hinges.

BACKGROUND

Conventional door hinges include two mating leaves, with each leaf including a substantially flat web that is fastened to either a door or a door frame, and knuckles that interlock with a pivot pin passing through the knuckles. Another type of conventional hinge is a continuous hinge, which typically runs for the entire length of a door. Continuous hinges typically include two leaves, each with vertical teeth that act like gears, such as spur gear teeth, extending from heads at one edge of the webs, and each webs is attached to either a door or a door frame. The axis of the head is normally vertically aligned when the hinge and door are installed. The vertical teeth of the gear of each head of the two leaves mate with each other. The teeth may extend only around a portion of the head as required to maintain range of motion desired for the door. The teeth may extend only up to where the web and head connect. A cover is typically provided that may be substantially C-shaped to receive the heads of each leaf when the heads of the leaves are put together. The cover typically runs the full length of the hinge and prevents the leaves from separating.

SUMMARY

The door hinge disclosed in the present application may be a split hinge (otherwise described as a modular hinge) that mimics a continuous hinge (e.g., extending along a portion of, the majority of, or the entire length of the door edge and/or the door frame), and is operatively coupled to the door and the door frame for pivotal movement of the door relative to the frame between a closed position and one or more open positions (e.g., including a fully open position). The split hinge may comprise two or more portions, such as at least a first hinge portion and a second hinge portion. The first hinge portion and the second hinge portion may each comprise two leaves (e.g., two first leaves and two second leaves) having first webs operatively coupled to first heads and second webs operatively coupled to second heads, respectively. A first cover is operatively coupled to the two first leaves (e.g., the first heads of the first leaves) to form the first hinge portion. A second cover is operatively coupled to the two second leaves (e.g., the second heads of the second leaves) to form the second hinge portion. As will be described herein, the first leaves and the second leaves may have the same or different lengths. Moreover, the first cover and the second cover may have the same or different lengths. The two first leaves may have first leaf lengths that are greater than or less than the first cover, while the two second leaves may have second leaf lengths that are greater than or less than the second cover. In particular embodiments, each cover cannot have the same length as the leaf lengths of the leaves to which it is operatively coupled. For example, the first leaf lengths of the two first leaves may not be the same as the first cover length of the first cover. Moreover, the second leaf lengths of the two second leaves may not be the same as the second cover length of the second cover. Consequently, in order to operatively couple the first hinge portion and the second hinge portion, the first cover may extend over the two first leaves, the second cover may extend over the two second leaves, and a portion of the first cover may extend over a portion of the two second leaves or a portion of the second cover may extend over a portion of the two first leaves. Alternatively, a third cover may extend over a portion of the first leaves and a portion of the second leaves. Moreover, one or more extension hinge portions (having extension leaves and an extension cover) may be utilized in order to customize the length of the assembled split hinge and/or further reduces the lengths of the first hinge portion and/or the second hinge portion.

One embodiment of the invention comprises a door hinge. The door hinge comprises a first hinge portion and a second hinge portion. The first hinge portion comprises two first leaves, and each of the two first leaves comprises a first web and a first head extending from the first web and having a longitudinal axis. The first hinge portion further comprises a first cover operatively coupled to the two first leaves. The second hinge portion comprises two second leaves, and each of the two second leaves comprises a second web and a second head extending from the second web and having a longitudinal axis. The second hinge portion further comprises a second cover operatively coupled to the two second leaves. The first hinge portion is operatively coupled to the second hinge portion through the first cover or the second cover.

In further embodiments, the two first leaves have first leaf lengths that are different than a first cover length of the first cover, and the two second leaves have second leaf lengths that are different than a second cover length of the second cover.

In other embodiments, the two first leaves have first leaf lengths and the two second leaves have second leaf lengths.

In still other embodiments, the first leaf lengths are greater than the second leaf lengths.

In yet other embodiments, the first leaf lengths are less than the second leaf lengths.

In other embodiments, the first leaf lengths are equal to the second leaf lengths.

In further embodiments, a first web length of the first web is less than a first head length of the first head, and a second web length of the second web is greater than a second head length of the second head.

In other embodiments, a first web length of the first web is greater than a first head length of the first head, and a second web length of the second web is less than a second head length of the second head.

In still other embodiments, the first cover has a first cover length and the second cover has a second cover length.

In yet other embodiments, the first cover length is greater than the second cover length.

In other embodiments, the second cover length is greater than the first cover length.

In further embodiments, the first cover length is equal to the second cover length.

In other embodiments, the door hinge further comprises one or more couplings for operatively coupling the first cover to one or more of the two first leaves or one or more of the two second leaves.

In still other embodiments, the one or more couplings comprise a first coupling for operatively coupling the first cover to the one or more of the two first leaves. The one or more couplings comprise a second coupling for operatively coupling the second cover to the one or more of the two second leaves. The one or more couplings comprise a third coupling for operatively coupling the first cover to the one or more of the two second leaves or the second cover to the one or more of the two first leaves.

In yet other embodiments, the third coupling operatively couples the first cover to the one or more of the two second leaves.

In other embodiments, the third coupling operatively couples the second cover to the one or more of the two first leaves.

In further embodiments, the one or more couplings comprise a set screw.

In other embodiments, the door hinge further comprises an extension hinge portion. The extension hinge portion comprises two extension leaves, each of the two extension leaves comprise an extension web and an extension head extending from the extension web and having a longitudinal axis. The extension hinge portion further comprises an extension cover operatively coupled to the two first leaves. The extension hinge portion is operatively coupled to the first hinge portion or the second hinge portion.

Other embodiments of the invention comprise a door assembly comprising a door, a door frame, and a door hinge. The door hinge comprises a first hinge portion and a second hinge portion. The first hinge portion comprises two first leaves, and each of the two first leaves comprises a first web and a first head extending from the first web and having a longitudinal axis. The first hinge portion further comprises a first cover operatively coupled to the two first leaves. The second hinge portion comprises two second leaves, and each of the two second leaves comprises a second web and a second head extending from the second web and having a longitudinal axis. The second hinge portion further comprises a second cover operatively coupled to the two second leaves. The first hinge portion is operatively coupled to the second hinge portion through the first cover or the second cover. One of the two first leaves and one of the two second leaves are operatively coupled to a door, and another of the two first leaves and the two second leaves are operatively coupled to the door frame.

Other embodiments of the invention comprise a method of installing a door hinge to a door system. The method comprises assembling a first hinge portion to a second hinge portion. The first hinge portion comprises two first leaves, and each of the two first leaves comprises a first web and a first head extending from the first web and having a longitudinal axis. The first hinge portion further comprises a first cover operatively coupled to the two first leaves. The second hinge portion comprises two second leaves, and each of the two second leaves comprises a second web and a second head extending from the second web and having a longitudinal axis. The second hinge portion further comprises a second cover operatively coupled to the two second leaves. The first hinge portion is operatively coupled to the second hinge portion through the first cover or the second cover. The method further comprises assembling one of the two first leaves and one of the two second leaves to a door frame, and assembling another of the two first leaves and another of the two second leaves to a door.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1:
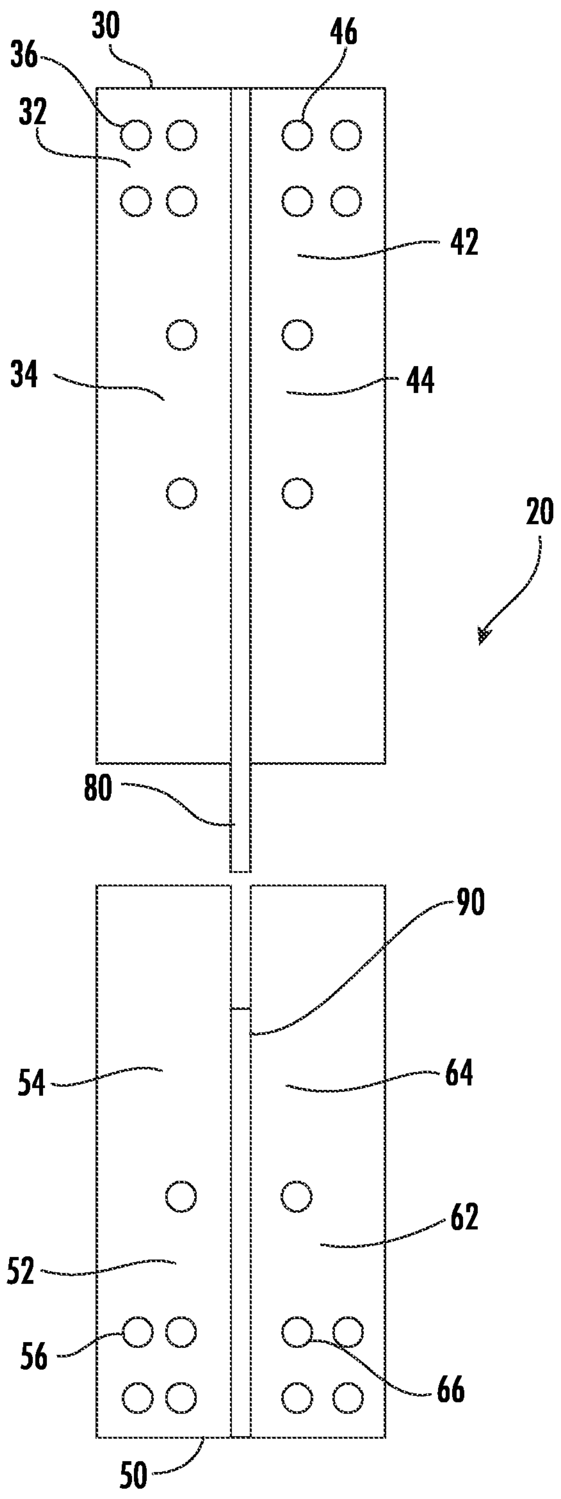

FIG. 1 is a front view of a split hinge having a first hinge portion and a second hinge portion, in accordance with embodiments of the present disclosure.

Figure 2:
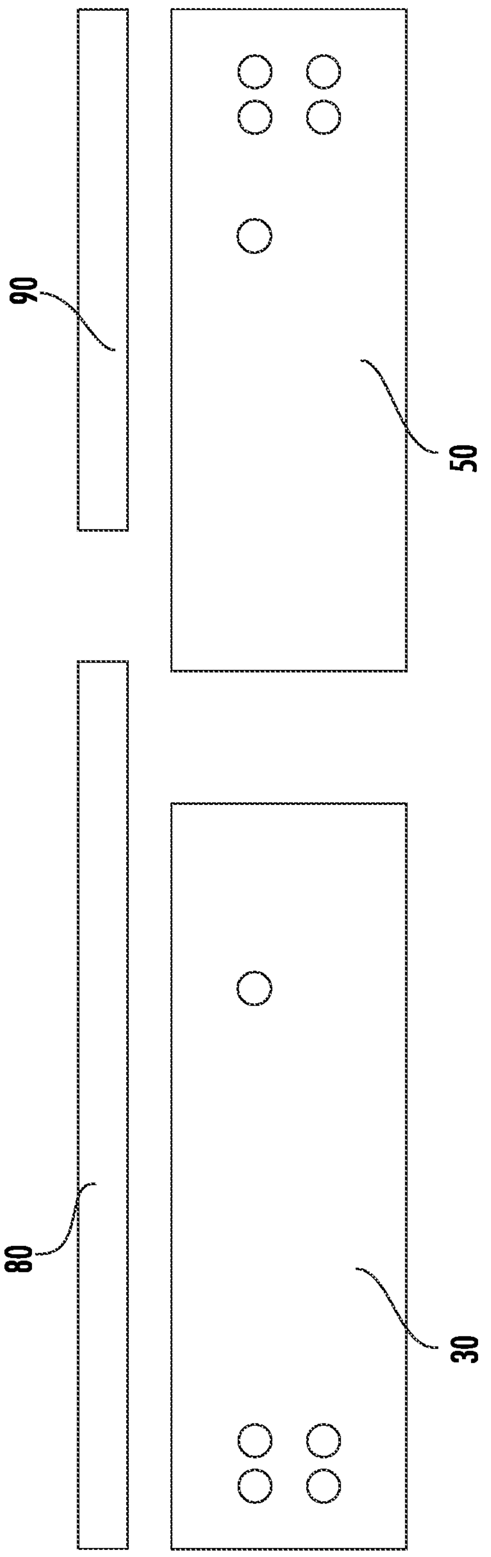

FIG. 2 is a side front view of a split hinge having first leaves, second leaves, a first cover, and a second cover, in accordance with embodiments of the present disclosure.

Figure 3:
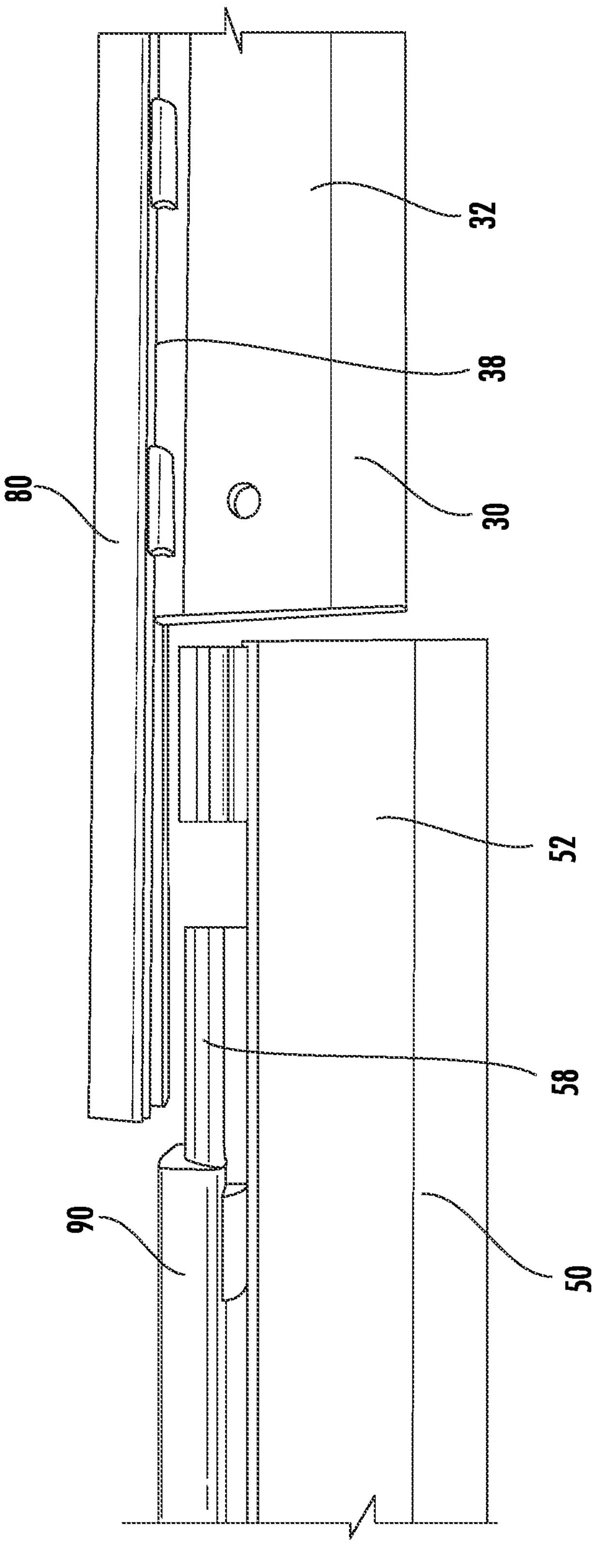

FIG. 3 is a side view of a portion of split hinge having two first leaves assembled to a first cover and two second leaves assembled to a second cover, in accordance with embodiments of the present disclosure.

Figure 4:
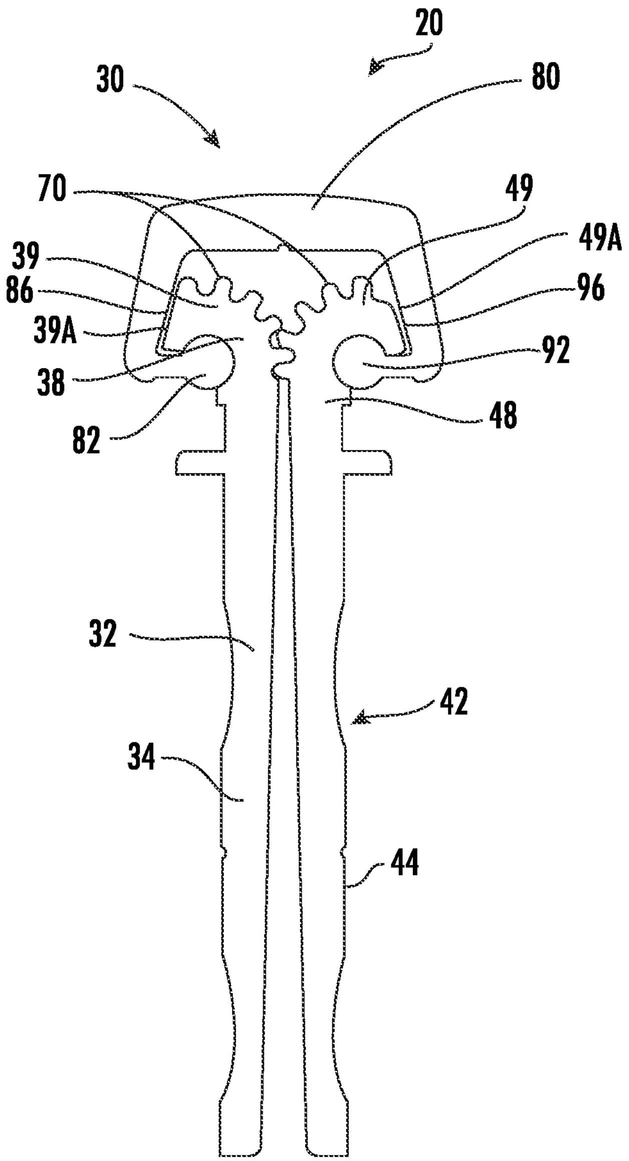

FIG. 4 is a cross-sectional view of a first hinge portion, in accordance with embodiments of the present disclosure.

Figure 5:
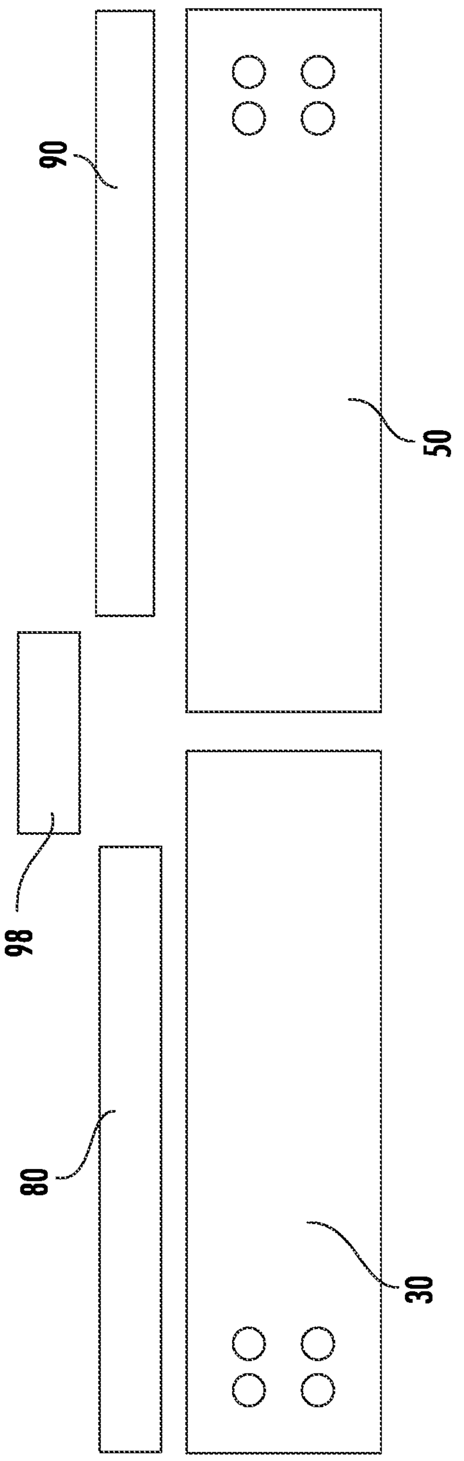

FIG. 5 is a side front view of a split hinge having first leaves, second leaves, a first cover, a second cover, and a third cover, in accordance with embodiments of the present disclosure.

Figure 6A:
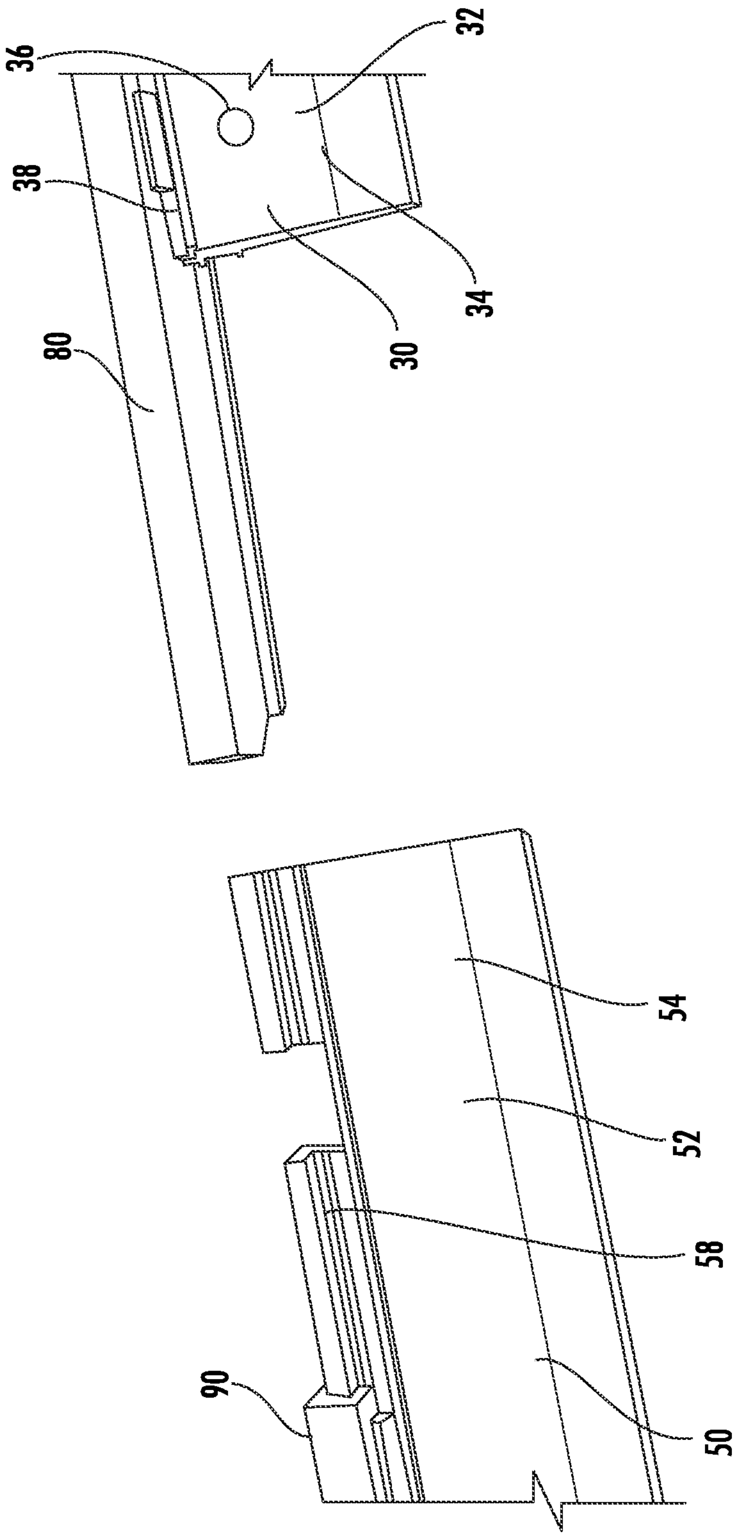

FIG. 6A is a side view of a portion of a split hinge having a first hinge portion before assembly with a second hinge portion, in accordance with embodiments of the present disclosure.

Figure 6B:
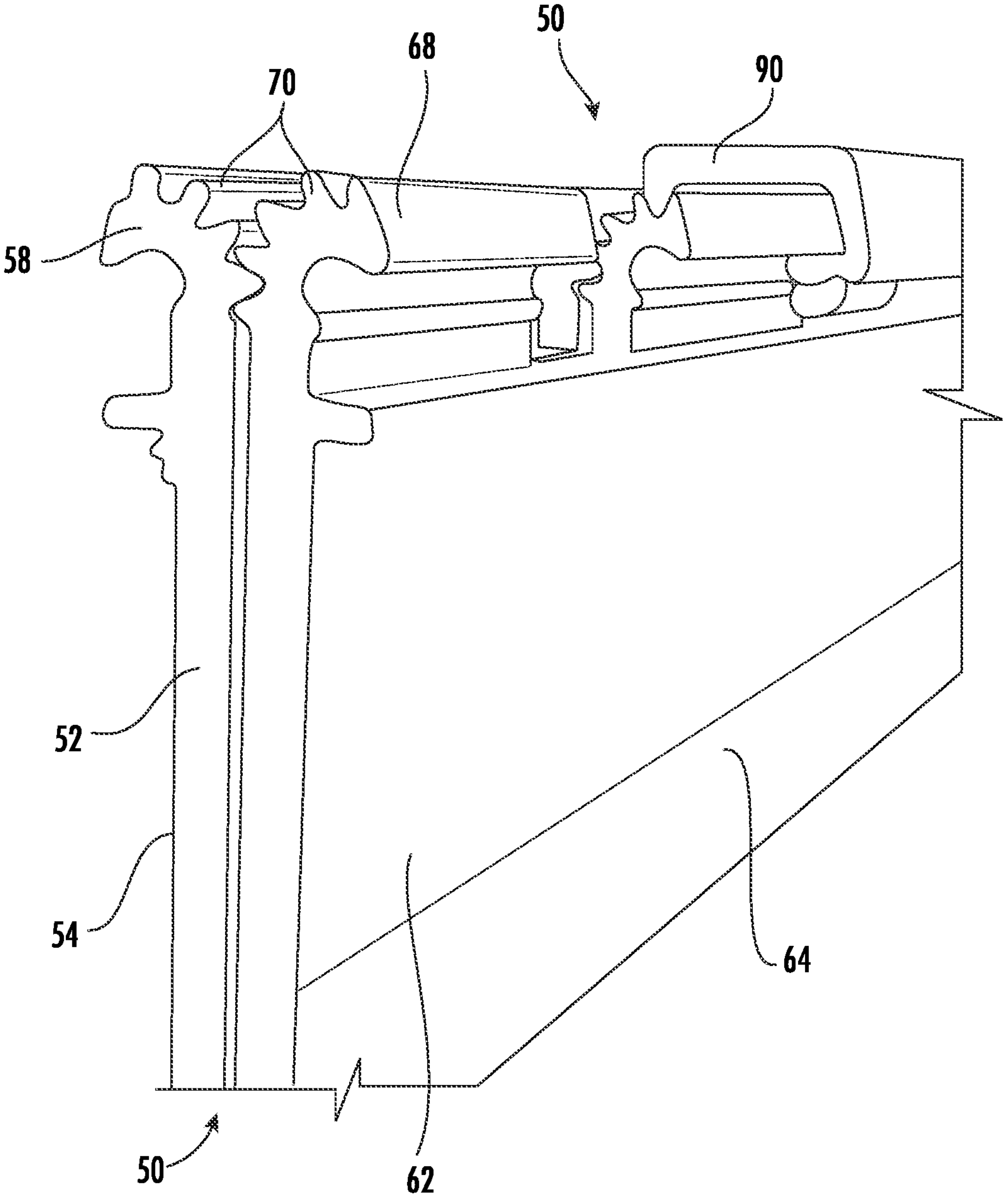

FIG. 6B is a perspective view of the second hinge portion of FIG. 6A, in accordance with embodiments of the present disclosure.

Figure 7:
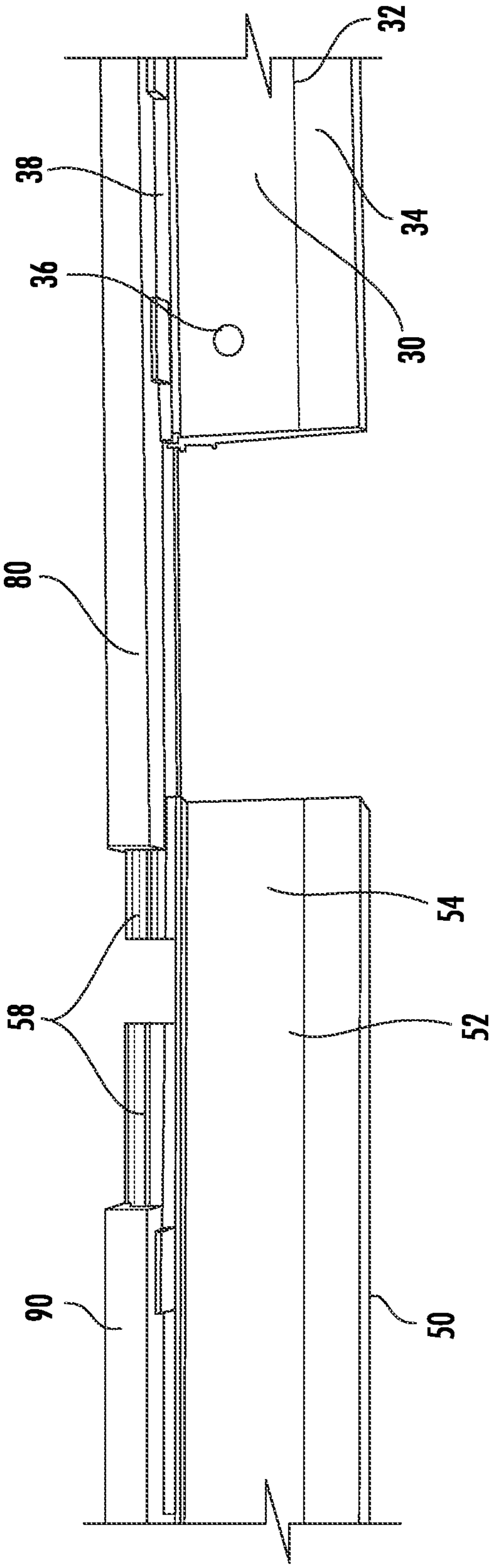

FIG. 7 is a side view of a portion of a split hinge in which a first cover of a first hinge portion is being assembled to two second leaves of a second hinge portion, in accordance with embodiments of the present disclosure.

Figure 8:
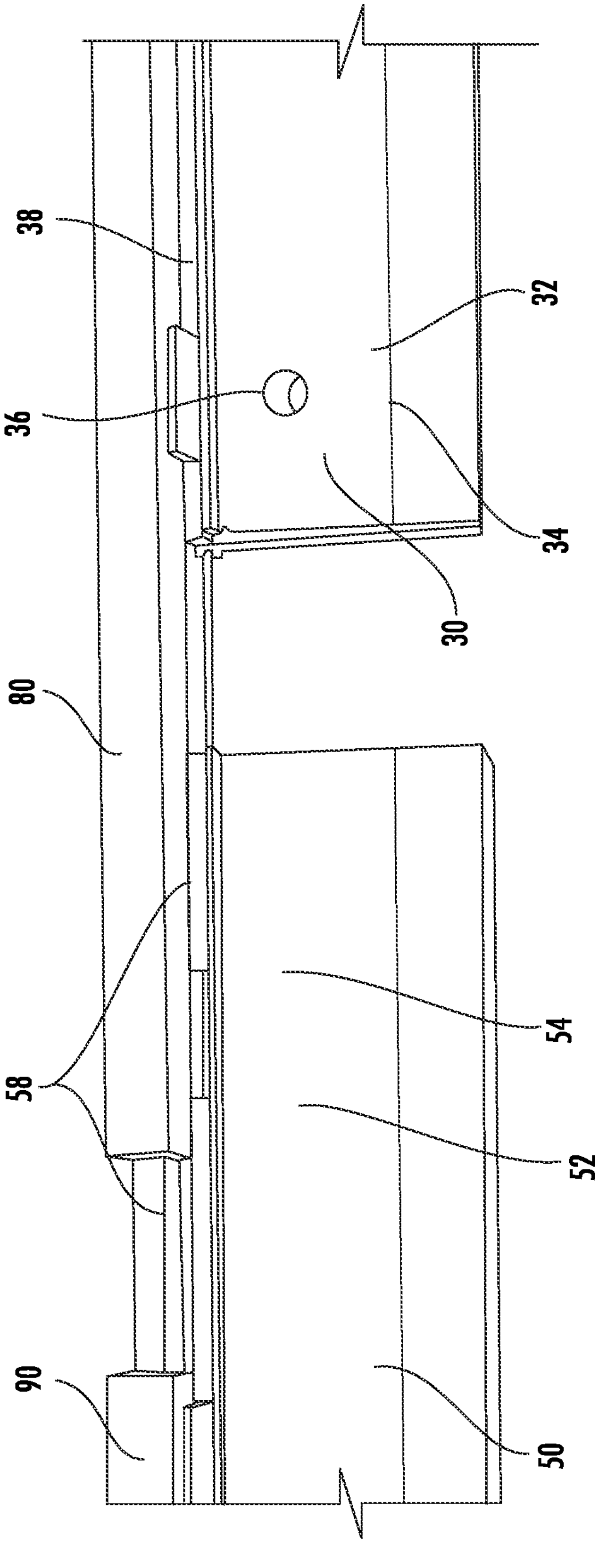
Figure 9:
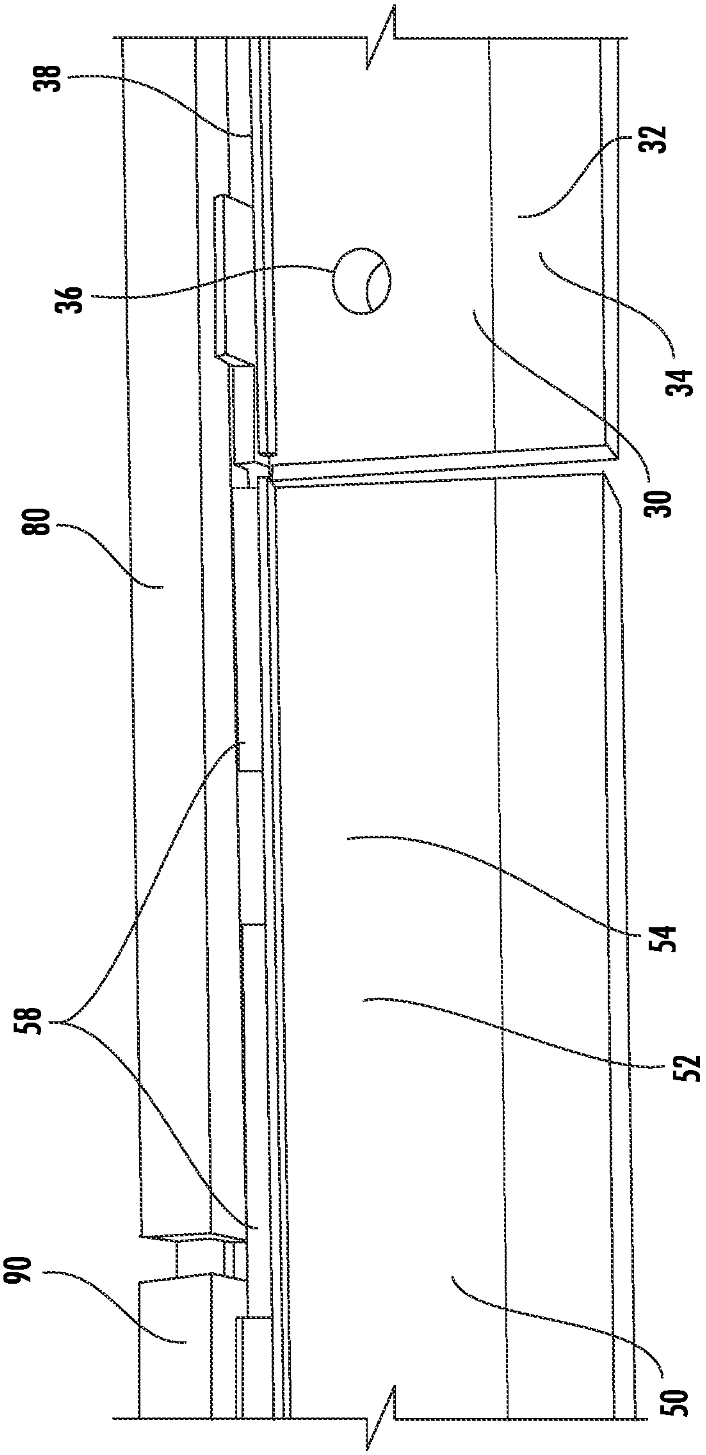
Figure 10:
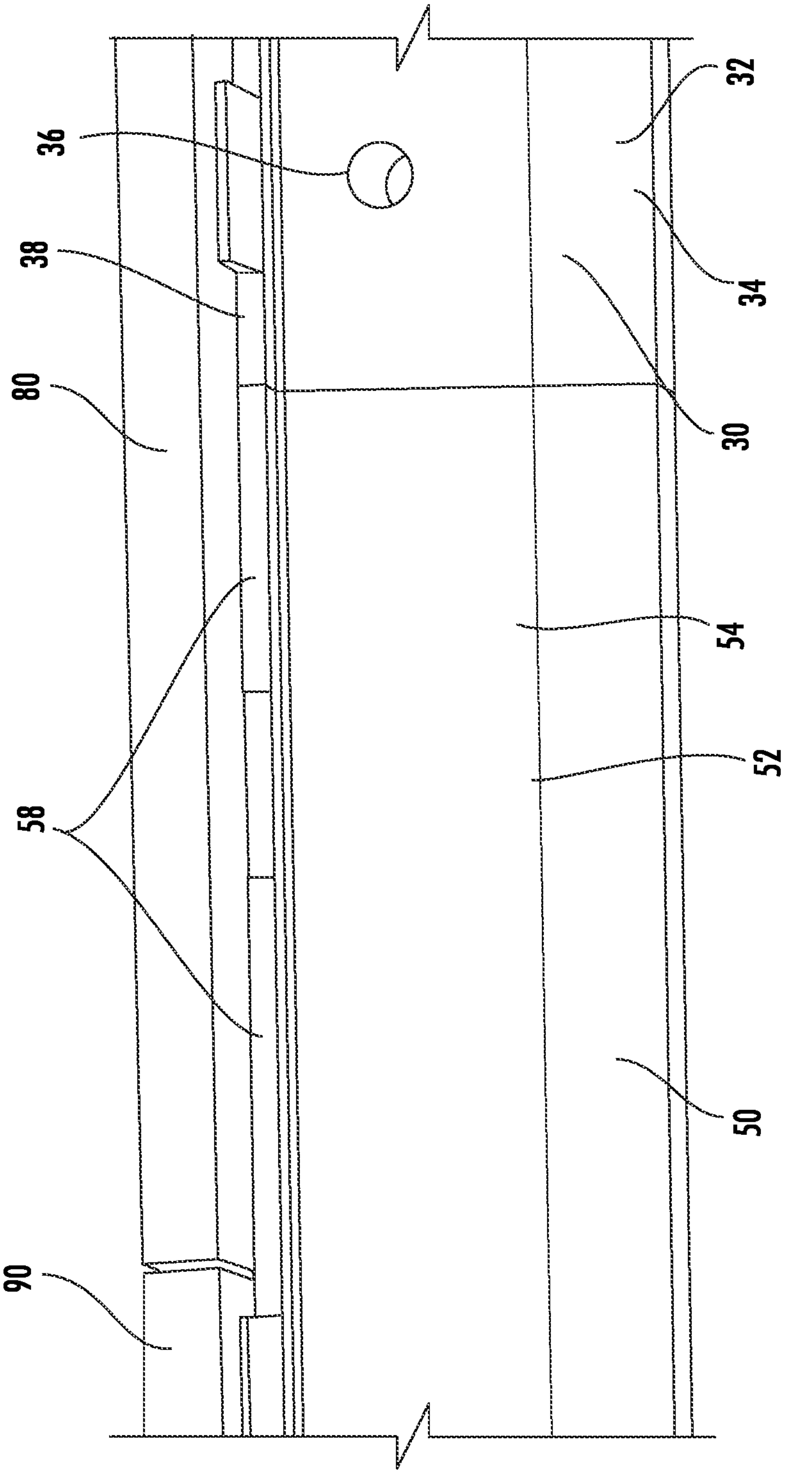

FIG. 8 is a side view of a portion of a split hinge in which a first cover of a first hinge portion is being further assembled to two second leaves of a second hinge portion, in accordance with embodiments of the present disclosure FIG. 9 is a side view of a portion of a split hinge before completion of the assembly of a first cover of a first hinge portion to two second leaves of a second hinge portion, in accordance with embodiments of the present disclosure FIG. 10 is a side view of a split hinge having a first hinge portion assembled to a second hinge portion in which a first cover is assembled with two second leaves, in accordance with embodiments of the present disclosure.

Figure 11:
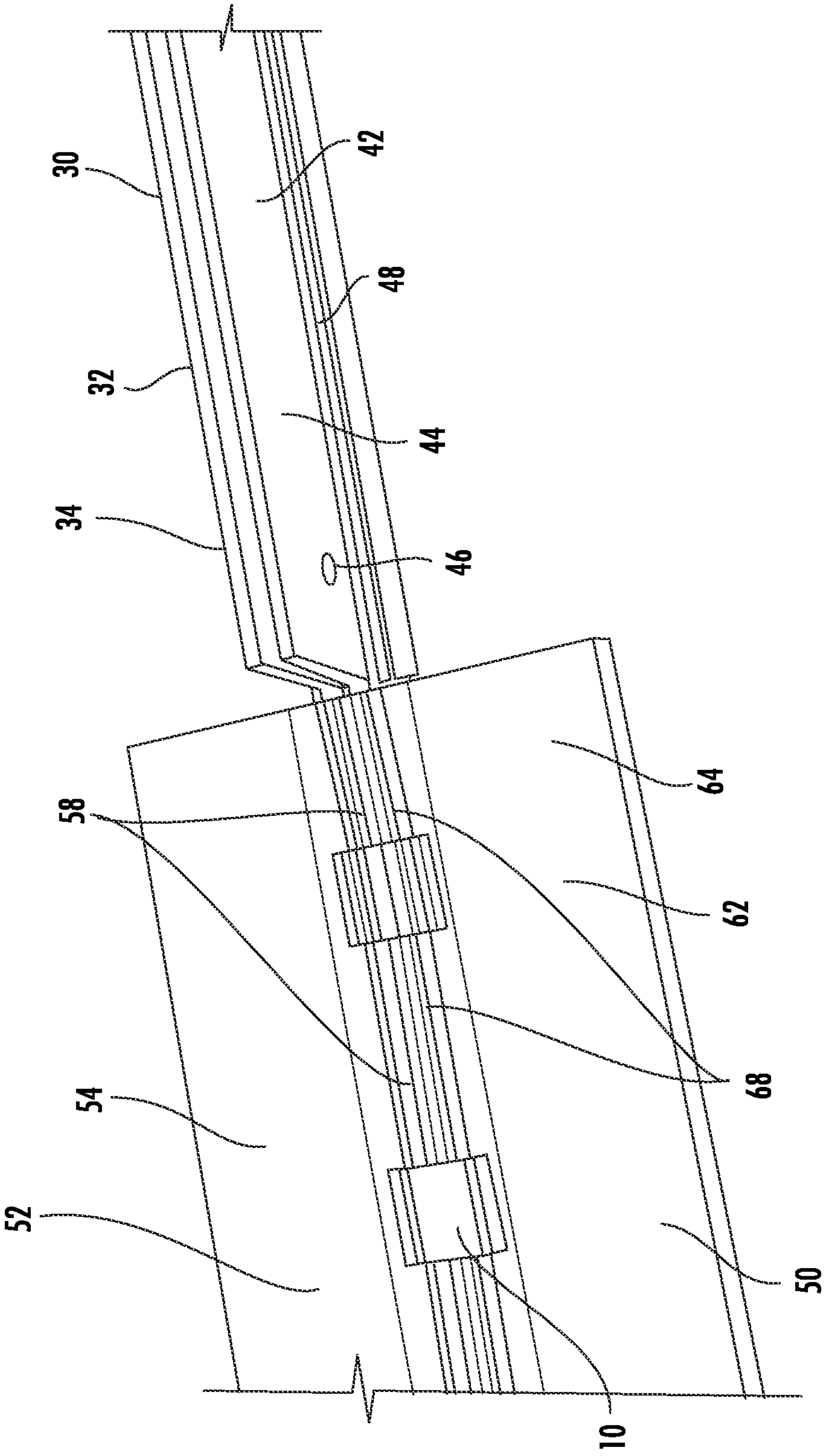

FIG. 11 is a front view of an assembled split hinge having a first hinge portion that is open and second hinge portion that is closed, in accordance with embodiments of the present disclosure.

Figure 12:
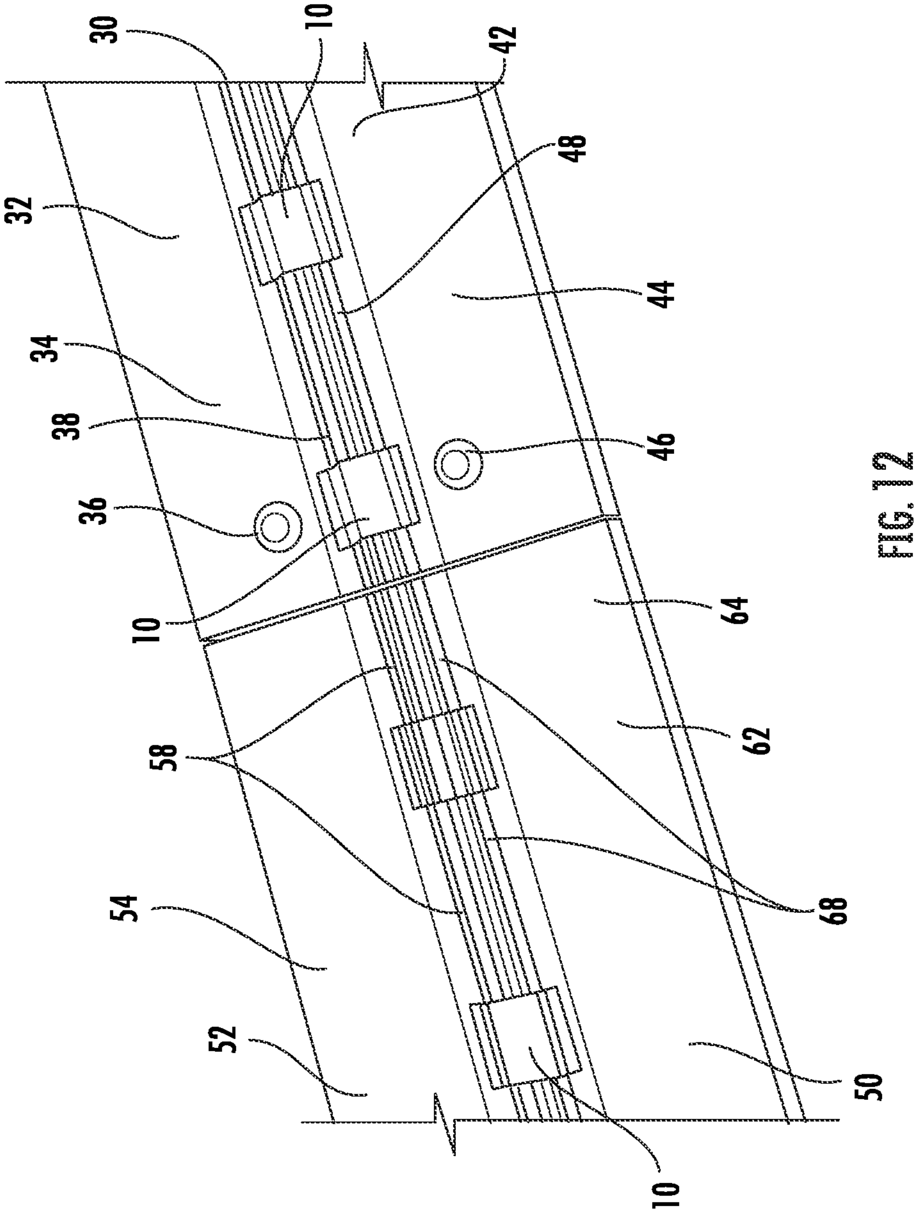

FIG. 12 is a front view of an assembled split hinge having a first hinge portion that is open and second hinge portion that is open, in accordance with embodiments of the present disclosure.

Figure 13A:
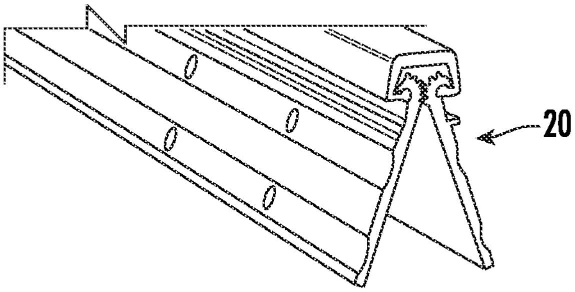

FIG. 13A is a perspective view of a full mortise hinge, in accordance with embodiments of the present disclosure.

Figure 13B:
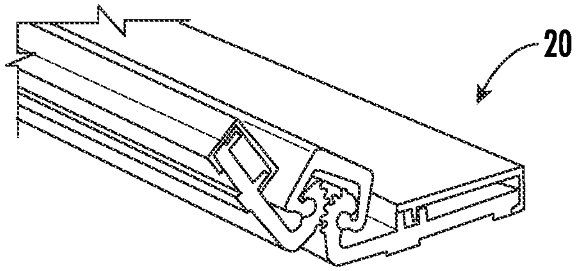

FIG. 13B is a perspective view of a full surface hinge, in accordance with embodiments of the present disclosure.

Figure 13C:
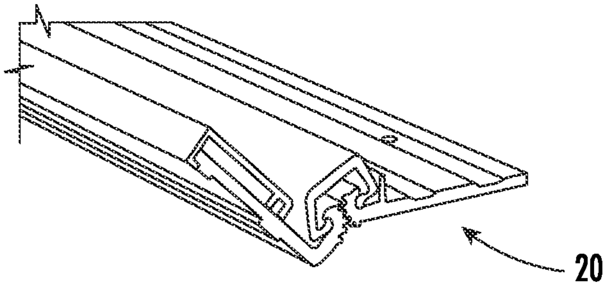

FIG. 13C is a perspective view of a half mortise hinge, in accordance with embodiments of the present disclosure.

Figure 13D:
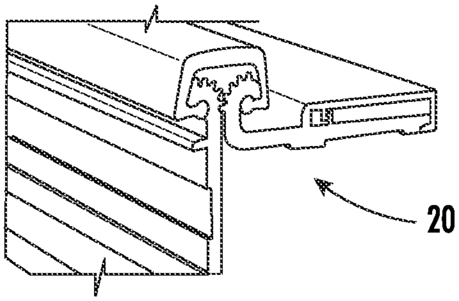

FIG. 13D is a perspective view of a half surface hinge, in accordance with embodiments of the present disclosure.

Figure 13E:
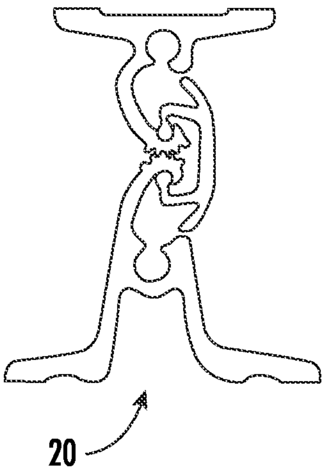

FIG. 13E is a perspective view of a double swing hinge, in accordance with embodiments of the present disclosure.

Figure 13F:
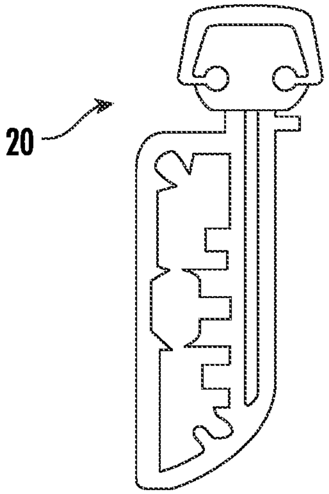

FIG. 13F is a perspective view of an emergency release stop hinge, in accordance with embodiments of the present disclosure.

Figure 13G:
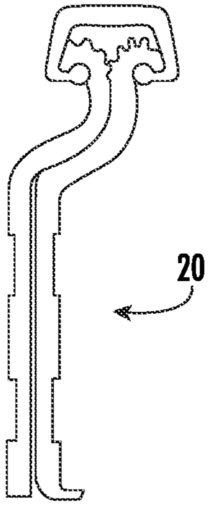

FIG. 13G is a perspective view of a hinge having offset webs, in accordance with embodiments of the present disclosure.

Figure 13H:
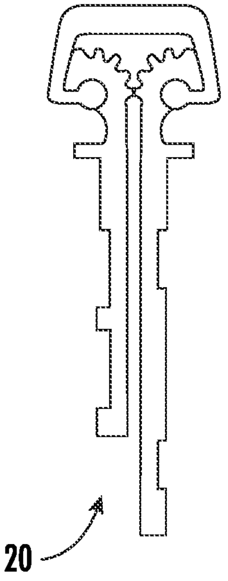

FIG. 13H is a perspective view of a hinge having webs of different lengths, in accordance with embodiments of the present disclosure.

Figure 14:
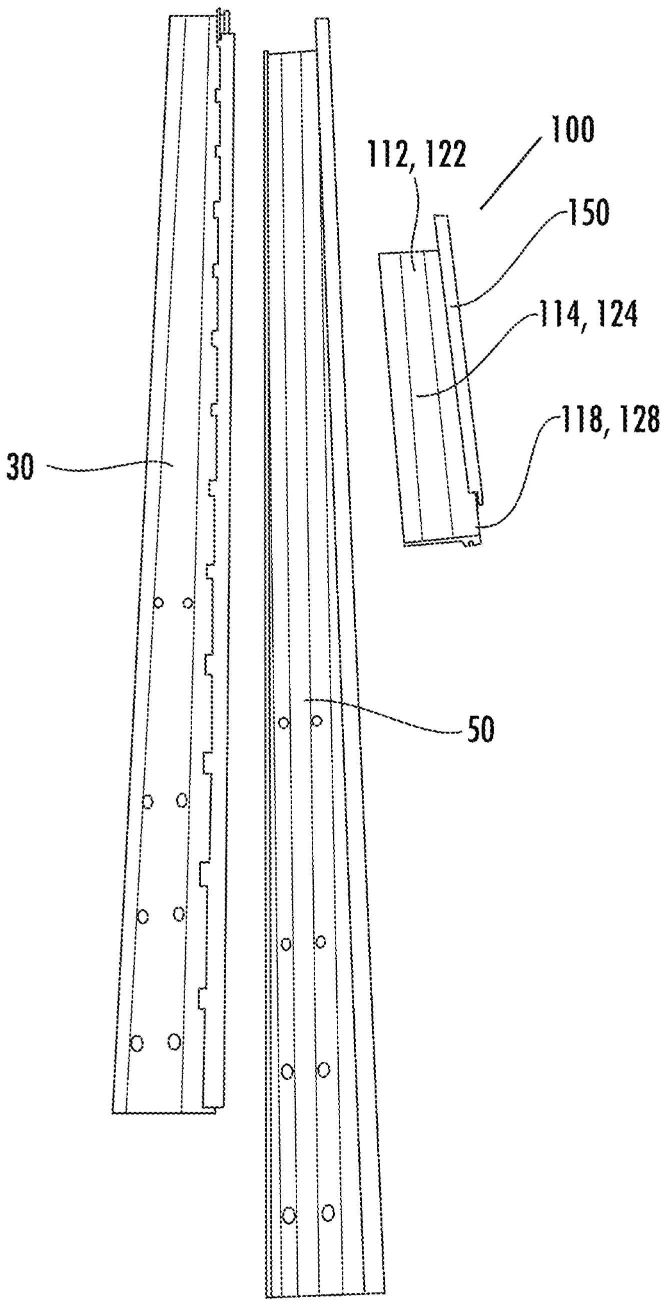

FIG. 14 is a perspective view of an unassembled hinge having a first hinge portion, a second hinge portion, and a third hinge portion, in accordance with embodiments of the present disclosure.

FIG. 15 is a method of manufacturing, delivering, and installing a split hinge, in accordance with embodiments of the present disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Referring now to the drawings, wherein like reference numerals designate corresponding or similar elements throughout the several views, embodiments of a door hinge are shown in FIGS. 1-5. The door hinge disclosed in the present application may be a split hinge 20 that mimics a continuous hinge (e.g., extending along a portion of, the majority of, or the entire length of the door edge and/or the door frame), and is operatively coupled to the door and the door frame for pivotal movement of the door relative to the frame between a closed position and one or more open positions (e.g., including a fully open position). As illustrated in FIGS. 1-4 the split hinge 20 may comprise a first hinge portion 30 and a second hinge portion 50. The first hinge portion 30 and the second hinge portion 50 may each comprise two leaves (e.g., two first leaves 32, 42 and two second leaves 52, 62) having first webs 34, 44 operatively coupled to first heads 38, 48 and second webs 54, 64 operatively coupled to second heads 58, 68, respectively. A first cover 80 is operatively coupled to the two first leaves 32, 42 (e.g., the first heads 38, 48 of the first leaves 32, 42) to form the first hinge portion 30. A second cover 90 is operatively coupled to the two second leaves 52, 62 (e.g., the second heads 58, 68 of the second leaves 52, 62) to form the second hinge portion 50. As will be described herein, the first leaves 32, 42 and the second leaves 52, 62 may have the same or different lengths. Moreover, the first cover 80 and the second cover 90 may have the same or different lengths. The two first leaves 32, 42 may have first leaf lengths that are greater than or less than the first cover 80, while the two second leaves 52, 62 may have second leaf lengths that are greater than or less than the second cover 90. In particular embodiments, each cover cannot have the same length as the leaf lengths of the leaves to which it is operatively coupled. For example, the first leaf lengths of the two first leaves 32, 42 cannot be the same as the first cover length of the first cover 80. Moreover, the second leaf lengths of the two second leaves 52, 62 cannot be the same as the second cover length of the second cover 90. Consequently, in order to operatively couple the first hinge portion 30 and the second hinge portion 50, the first cover 80 may extend over the two first leaves 32, 42, the second cover 90 may extend over the two second leaves 52, 62, and a portion of the first cover 80 may extend over a portion of the two second leaves 52, 62 or a portion of the second cover 90 may extend over a portion of the two first leaves 32, 44.

Returning to FIGS. 1-4, the first hinge portion 30 and the second hinge portion 50 are described in further detail herein. The first hinge portion 30 may comprise two first leaves 32, 42. Each first leaf 32, 42 may include a first web 34, 44 (e.g., plates of any shape, orientation, length, or the like) and a first head 36, 46 extending at least partially along the edges of the first web 34, 44 (e.g., along a portion of, along an entirety of, and/or extending past an end of the first web 34, 44). The two first leaves 32, 42 may be described as a proximal first leaf 32 and a distal first leaf 42, and moreover, the features thereof may also be described as proximal and distal (e.g., a proximal first head 38, a distal first head 48, a proximal first web 34, and a distal first web 44). The second hinge portion 50 may comprise two second leaves 52, 62. Each second leaf 52, 62 may include a second web 54, 64 (e.g., plates of any shape, orientation, length, or the like) and a second head 56, 66 extending along the edges of the web 54, 64 (e.g., along a portion of, along an entirety of, and/or extending past an end of the first web 34, 44). The two second leaves 52, 62 may be described as a proximal second leaf 52 and a distal second leaf 62, and moreover, the features thereof may also be described as proximal and distal (e.g., a proximal second head 58, a distal second head 68, a proximal second web 54, and a distal second web 64).

The first webs 34, 44 and second webs 54, 64 may be integrally operatively coupled (e.g., formed integrally with) to the first heads 38, 48 and second heads 58, 68, respectively. Alternatively, the first webs 34, 44 and second webs 54, 64 may be formed separately from the first heads 38, 48 and second head 58, 68, and thereafter, operatively coupled to the first heads 38, 48 and second heads 58, 68, respectively (e.g., connected through fasteners, welds, or the like). The first webs 34, 44 and the second webs 56, 66 may be adapted to be mounted to a door or a door frame, as applicable, through the use of fasteners (e.g., screws, rivets, bolts, or the like) through apertures in the webs 36, 46, 56, 64.

The heads 38, 48, 58, 68 may be continuous and extend along the entire length of the related webs 34, 44, 54, 64, or the heads 38, 48, 58, 68 may be discontinuous (e.g., have one or more slots between separate head portions) and be located only over a portion of the related webs 34, 44, 54,

64. For example, hinge slots 22 may be formed (e.g., milled, or the like) in the leaves 32, 42, 52, 62 and one or more bearings 10 (e.g., plastic, metal, composite, or other like bearings 10) may be operatively coupled to the leaves 32, 42, 52, 62 at the locations of the hinge slots 22 (e.g., the slots receive the bearings 10). The bearings 10 bear the weight of the door and keep adjacent leaves from sliding past each other. The heads 38, 48, 58, 68 may comprise gear teeth 70, extending therefrom (e.g., from substantially arcuate portion of each head 38, 48, 58, 68). The gear teeth 70 may be radial, helical, or other shaped gear teeth, and may extend around at least a portion of the heads 38, 48, 58, 68 (e.g., the arcuate portion for a distance adequate for the gear teeth to mesh throughout the full range of motion of the hinge 20, or the like).

FIG. 4 illustrates a cover (e.g., a first cover 80) operatively coupling one first leaf 32 to another first leaf 42. The covers 80, 90 may be substantially C-shaped with returns at each end. At the end of each return, a portion may be provided that is substantially circular in cross-section to act as a pivot feature 82, 92 received by the head 38, 48, 58, 68 of a leaf 32, 42, 52, 62, which may be considered a hook portion 39, 49, 59, 69. Each leaf 38, 48, 58, 68 pivots around the pivot feature 82, 92 while the gear teeth 70 mesh centrally between the pivot features 82, 92. The hook portions 39, 49, 59, 69 truncate abruptly at hook ends 39A, 49A, 59A, 69A, which in this embodiment are flat surfaces (however, the hook ends 39A, 49A, 59A, 69A may have any surface of any shape). The hook ends 39A, 49A, 59A, 69A, in some embodiments are truncated in order to permit the closing of the hinge 20, when they are received in pockets 86, 96 in the covers 80, 90 as shown in FIG. 4. While the pivot features 82, 92 are illustrated a substantially circular in cross-section, the pivot features can be any shape around which a portion of the leaves (e.g., the hooks or other feature may pivot). As will be described in further detail with respect to FIG. 15, the split hinge 30 may be assembled by meshing the gear teeth 70 together in proper alignment, which may be most easily done in the position of FIG. 4. This corresponds to the position of a closed door with the webs 34, 44, 54, 64 in or near contact with each other, and then the first cover 80 may be slid over the first heads 38, 48 of the first leaves 32, 42, while the second cover 90 may be slid over the second heads 58, 68 of the second leaves 52, 62. It should be understood that the second cover 90 of the second portion 50 and/or an extension cover 150 of an extension hinge portion 100 (described in further detail below) have the same or similar components and may be assembled in the same or similar way.

As previously discussed, it should be understood that the door hinge 20 may be formed such that the first leaves 32, 42 and the first cover 80 have different lengths and the second leaves 52, 62 and the second cover 90 have different lengths. As such, the first leaves 32, 42 have first leaf lengths and the second leaves 52, 62 have second leaf lengths. In some embodiments, the first leaf lengths of the first hinge portion 30 is equal to the second leaf lengths of the second hinge portion 50. Moreover, the first cover length of the first cover 80 may be greater than the second cover length of the second cover 90. As such, in this embodiment, the first cover 80 may be operatively coupled to the first heads 38, 48 of the first hinge portion 30, and extend over and be operatively coupled to the second heads 58, 68 of the second hinge portion 50. As such, the second cover 90 may only be operatively coupled to the second heads 58, 68 of the second hinge portion 50.

In other embodiments, the first leaf lengths of the first leaves 32, 42 may be greater than the second leaf lengths of the second leaves 52, 62. Moreover, the first cover length of the first cover 80 may be less than or equal to the second cover length of the second cover 90. As such, in this embodiment, the first cover 80 may be operatively coupled to only the first heads 38, 48 of the first hinge portion 30. As such, the second cover 90 may be operatively coupled to the second heads 58, 68 of the second hinge portion, and extend over and be operatively coupled to the first heads 38, 48 of the first hinge portion 30.

In other embodiments, the first leaf lengths of the first leaves 32, 42 may be less than the second leaf lengths of the second leaves 52, 62. Moreover, the first cover length of the first cover 80 may be greater than or equal to the second cover length of the second cover 90. As such, in this embodiment, the first cover 80 may be operatively coupled to the first heads 38, 48 of the first hinge portion 30 and extend over and be operatively coupled to the second heads 38, 48 of the second hinge portion 50. As such, the second cover 90 may be operatively coupled to only the second heads 58, 68 of the second hinge portion 50.

It should be understood that the first leaves 32, 42 and the second leaves 52, 62, as well as the first cover 80 and the second cover 90 may have any lengths, and as such be operatively coupled together in various configurations. Moreover, while the split hinge 20 is only described herein as being split into a first hinge portion 30 and a second hinge portion 50, it should be understood that the split hinge 20 and/or components thereof may be split into any number of portions (e.g., three or more portions, or the like). As illustrated in FIG. 5, in one example, the split hinge 20 may have two first leaves 32, 42 and two second leaves 52, 62, but the cover may be split into three covers. As such, the first cover 80 may be operatively coupled to the two first leaves 32, 42, the second cover may be operatively coupled to the two second leaves 52, 62, and a third cover 98 may be operatively coupled to a portion of the two first leaves 32, 42 and a portion of the two second leaves 52, 62 (e.g., located in the middle of the split hinge 20).

By splitting the hinge 20 into two portions it should be understood that the first leaves 32, 42, the second leaves 52, 62, the first cover 80, and the second cover 90 (or other leaves and/or covers) may be manufactured, packaged, and/or shipped more easily when compared to a single unsplit continuous hinge, as will be described in further detail with respect to FIG. 15. Moreover, by utilizing a split hinge 20 having first leaves 32, 42 and second leaves 52, 62, a first cover 80, and a second cover 90 having different lengths allows for an installer to pre-assemble the split hinge 20 before operatively coupling the hinge to the door and/or the door frame. As will be described in further detail with respect to FIG. 15, by pre-assembling the split hinge 20, the installer can avoid potential alignment issues that could occur by assembling different hinge portions on the door and/or the door frame separately.

FIGS. 6A-10 illustrate the assembly of the first hinge portion 30 to the second hinge portion 50. In the illustrated embodiments, the first cover 80 has a cover length that is greater than first leaf lengths 32, 42 of the first hinge portion 30, while the second cover 90 has a cover length that is less than second leaf lengths 52, 62 of the second hinge portion 50. As illustrated in FIGS. 6A and 6B, the first cover 80 is operatively coupled to the first leaves 32, 42, as previously described herein (e.g., sliding the cover 80 over the first heads 38, 48 of the first leaves 32, 42). Moreover, the second cover 90 is operatively coupled to the second leaves 52, 62, as previously described herein (e.g., sliding the cover 90 over the second heads 58, 68 of the second leaves 52, 62).

As illustrated in FIG. 7 the first hinge portion 30 is operatively coupled to the second hinge portion 50 by sliding the first cover 80 over the second heads 58, 68 of the second leaves 52, 62. As further illustrated in FIGS. 8-10, the first cover 80 continues to slide over the second heads 58, 68 of the second leaves 52, 62 until an end of the first hinge portion 30 butts against an end of the second hinge portion 50 and/or an end of the first cover 80 butts against an end of the second cover 90.

In some embodiments of the invention, one or more couplings may be utilized to aid in preventing the first cover 80 and the second cover 90 from further movement with the first leaves 32, 42 and/or the second leaves 52, 62. For example, one or more first couplings may be utilized for operatively coupling the first cover 80 to the first leaves 32, 42 and/or the second leaves 52, 62; one or more second couplings may be utilized for operatively coupling the second cover 90 to the second leaves 52, 62 and/or the first leaves 32, 42 (e.g., depending on the lengths of the first leaves 32, 42, the second leaves 52, 62, the first cover 80, and/or the second cover 90). In some embodiments the couplings may comprise any type of fastener (e.g., set screw, nut, bolt, or the like), clamp, clip, pin, or any other coupling may be utilized to operatively couple the covers 80, 90 to the leaves 32, 42, 52, 62.

FIGS. 11 and 12 illustrate that the first leaves 32, 42 and the second leaves 52, 62 operate independently of each other to open and close as the teeth 70 of the first heads 38, 48 and second heads 58, 68 operate independently of each other. While the first hinge portion 30 and the second hinge portion 50 may operate independently when the split hinge 20 is pre-assembled, when the split hinge 20 is assembled to a door and/or a door frame, the first hinge portion 30 and the second hinge portion 50 will operate together to allow a door to open and close.

It should be further understood that in some embodiments the heads 38, 48, 58, 68 may be longer or shorter than the webs 34, 44, 54, 64 of the first hinge portion 30 and/or the second hinge portion 50. Additionally, or alternatively, one first head 38 (e.g., a proximal first head 38) may be longer or shorter than another first head 48 (e.g., a distal first head 48), while one second head 58 (e.g., a proximal second head 58) may be longer or shorter than another second head 68 (e.g., a distal second head 68). In this way, a first head 38 of the first hinge portion 30 may interact with a second head 68 of a second hinge portion 50, such that even though the first hinge portion 30 may be split from a second hinge portion 50, the hinge portions operate together when assembled. For example, teeth 70 of one of the first heads 38 moves with the teeth 70 of the other first head 48 and with the teeth 70 of one of the second heads 68. In these configurations, the heads 38, 48, 58, 68 and/or webs 34, 44, 54, 64, in addition to the covers 80, 90 may also aid in operative coupling of the first hinge portion 30 to the second hinge portion 50 (e.g., to aid in the stability of the hinge 20, or the like).

FIGS. 13A through 13H illustrate different types of hinges that may utilize the split hinge configuration described herein. As illustrated in FIG. 13A the split hinge 20 may be a full mortise hinge. As illustrated in FIG. 13B the split hinge 20 may be a full surface hinge. As illustrated in FIG. 13C the split hinge 20 may be a half mortise hinge. As illustrated in FIG. 13D the split hinge 20 may be a half surface hinge. As illustrated in FIG. 13E the split hinge 20 may be a double swing hinge. As illustrated in FIG. 13F the split hinge 20 may be an emergency release hinge. As illustrated in FIG. 13G the split hinge 20 may be an offset leaf hinge. As illustrated in FIG. 13H the split hinge 20 may be a short leaf hinge. It should be understood that disclosure provided herein may be incorporated into any type of continuous hinge or other type of hinge not explicitly discussed herein.

As previously discussed, in some embodiments the hinge 20 (including the covers 80, 90) may be split into more than two portions 30, 50, such as, but not limited to three, four, five, or any number of portions. Regardless of the number of portions into which the hinge 20 may be split, the lengths of the portions and/or the covers may be the same and/or different in order to allow for pre-assembly as previously described herein with respect to the first hinge portion 30 and the second hinge portion 50.

It should be understood that continuous hinges may range in length from 79 inches to 110 inches (or range within, outside, or overlap these values), and typically be about 1 inch shorter than the door height. For example, for a 7 foot door, the hinge may be 83 inches. In some embodiments, the split hinge 20 (including the covers 80, 90) may be standard sizes, such as to create a hinge that is 83 inches in length. However, one or more third hinge portions 100 (e.g., otherwise described as extension portions 100, extension hinge portion 100, or the like) may be utilized to provide additional flexibility in customizing the length of the split hinge 20, while keeping the length of any split hinges 20 below desired lengths for manufacturing, moving, packaging, shipping, installing, or the like.

As illustrated in FIG. 14, an extension hinge portion 100 may comprise two leaves (e.g., two extension leaves 112, 122) having extension webs 114, 124 operatively coupled to extension heads 118, 128. An extension cover 150 is operatively coupled to the two extension leaves 112, 122 (e.g., the extension heads 118, 128 of the extension leaves 112, 122) to form the extension hinge portion 100. The two extension leaves 112, 122 may have extension leaf lengths that are greater than, less than, or equal to the extension cover 150. In the illustrated embodiment in FIG. 14, the extension cover 150 and the two extension leaves 112, 122 have the same length, but are offset from each other to allow for operative coupling with the first hinge portion 30 and/or the second hinge portion 50. As previously discussed with respect to the covers 80, 90 of the first hinge portion 20 and the second hinge portion 90, the extension cover 150 may be substantially C-shaped with returns at each end and the extension heads 118, 128 may comprise gear teeth 70, extending therefrom, as was previously discussed with respect to FIG. 4. As such, at the end of each return, a portion may be provided that is substantially circular in cross-section to act as a pivot feature 82, 92 received by the head 118, 128 of a leaf 112, 122, which may be considered a hook portion 119, 129. Each leaf 112, 122 pivots around the pivot feature 82, 92 while the gear teeth 70 mesh centrally between the pivot features 82, 92. The hook portions 119, 129 truncate abruptly at hook ends 119A, 129A, which in this embodiment are flat surfaces (however, the hook ends 119A, 129A may have any surface of any shape). The hook ends 119A, 129A, in some embodiments are truncated in order to permit the closing of the hinge 20, when they are received in pockets 86, 96 in the cover 150, as previously described with respect to FIG. 4. As will be described in further detail with respect to FIG. 15, the split hinge 20 may be assembled by meshing the gear teeth 70 together in proper alignment, which may be most easily done in the position of FIG. 4. Like the first hinge portion 30 and the second hinge portion 50, the extension hinge portion 100 may also have couplings to aid in preventing the extension cover 150 moving with respect to the extension leaves 112, 122. Moreover, bearings 10 may also be used in the extension portion 100 as previously discussed with respect to the first hinge portion 30 and the second hinge portion 50.

It should be understood that the extension hinge portion may be operatively coupled to the first hinge portion 30 and/or the second hinge portion 50, or any other hinge portion (e.g., third, fourth, fifth, or the like portion) in the same or similar way as previously described herein with respect to the operative coupling between the first hinge portion 30 and the second hinge portion 50. Moreover, while the extension hinge portion 100 may be located between the first hinge portion 30 and the section hinge portion 50, it should be understood that the extension hinge portion 100 may be located on either end of the split hinge 20 (e.g., on the outer end of the first hinge portion 30 or the second hinge portion 50).

The extension hinge portion 100 may be made to be any length, such as 6, 7, 8, 9, 10, 11, 12, 13, 14, 15, 16, 17, 18, 19, 20, 21, 22, 23, 24, 30, 36, or the like inches (or range between, outside, or overlap any of these values). However, in particular embodiments it should be understood that the extension hinge portion 100 may be approximately 12 inches. As such, in one example embodiment, a hinge may be provided in a two part split hinge 20 (e.g., a first hinge portion 30 and a second hinge portion 50) that when assembled would form a hinge 20 having of length of approximately 83 inches. Moreover, one or more extension portions 100 having an extension length of approximately 12 inches could be provided to a user to create an assembled hinge 20 having a length of approximately 95 inches (e.g., with a first extension portion 100) or approximately 107 inches (e.g., with an additional second extension portion 100). As such, any number of extension portions 100 may be used to change the length of the assembled hinge. As such, regardless of the ultimate length of the assembled split hinge 20, the components may be manufactured, moved, packaged, shipped, delivered to the installation site, installed by a user (e.g., installer), or the like in a smaller configuration than a single continuous hinge (e.g., two or more portions, three or more portions, four or more portions, or the like have different or the same lengths in order to reduce the length of the package). For example, the packaging of the split hinge may be packaged in a package length that is less than approximately 48 inches (or any packaging that is less than or greater than 2, 4, 6, 8, 10, 12, 14, 16, 18, 20, 25, 30, or the like percent of 48 inches).

FIG. 15 illustrates a method of manufacturing, packaging, shipping, and installing the hinges 20 described herein. As illustrated in block 202 of FIG. 15, the hinge leaves may be manufactured to create the desired lengths of the leaves 32, 42, 52, 62, 112, 122. It should be understood that leaves of a continuous hinge may be formed, and thereafter, cut into the desired number of first leaves 32, 42, second leaves 52, 62, and/or extension leaves 112, 122, having the desired lengths. Alternatively, the first leaves 32, 42, second leaves 52, 62, and/or extension leaves 112, 114 may be manufactured to the desired length without cutting a larger continuous leaf. Regardless of how the leaves are formed, a variety of manufacturing methods may be used. The leaves 32, 42, 52, 62, 112, 122 including the webs 34, 44, 54, 64, 114, 124 and the heads 38, 48, 58, 68, 118, 128 and the teeth 70 therefor, may be formed by methods that include, for example, die casting, injection molding, machining, extruding a blank, embossing/coining the gear teeth, or the like. The teeth 70 may also be lubricated by being impregnated with a lubricant coating such as polytetrafluoroethylene. Materials used for the hinge leaves 32, 42, 52, 62, 112, 122 may include, for example, various materials such as aluminum, steel, stainless steel, plastic resin, composite (e.g., plastic resin over-molded onto a substrate of different material), or the like.

Block 204 of FIG. 15 further illustrates that the covers 80, 90, 150 may be manufactured to create the desired lengths of the covers 80, 90, 150. It should be understood that a continuous cover may be formed, and thereafter, cut into the desired number of first covers 80, second covers 90, extension covers 150 (if needed), or the like having the desired lengths. Alternatively, the first covers 80, second covers 90, extension covers 150 (if needed), or the like may be manufactured to the desired length without cutting a longer continuous cover. Regardless of how the covers 80, 90, 150 are formed, a variety of manufacturing methods may be used. The covers 80, 90, 150 may be formed by methods that include, for example, die casting, injection molding, machining, extruding a blank, embossing, and/or the like. Materials used for the covers 80, 90, 150 may include, for example, various materials such as aluminum, steel, stainless steel, plastic resin, composite (e.g., plastic resin over-molded onto a substrate of different material), or the like.

It should be understood that the leaves 32, 42, 52, 62, 112, 114 and covers 80, 90, 150 may be manufactured to the desired lengths to improve the packaging and shipping of the split hinge 20. For example, the first leaves 32, 42 may be formed to a first length that is equal to the second cover length of the second cover 90. Moreover, the second leaves 52, 62 may be formed to a second length that is equal to the first cover length of the first cover 80. As such, the length of the packaging may be created such that the length of the packaging may be sized base on the longer of the first leaves 32, 42 and the second cover 90 or the second leaves 52, 62 and the first cover 80. In other embodiments of the invention, the first leaves 32, 42 and second leaves 52, 62 may be the same length, and three covers may be utilized such that the length of the packaging is based on the length of the leaves 32, 42, 52, 62. Furthermore, the extension portion(s) 150 may have extension leaves 112, 122 and a cover 150 that are the same length (and offset) or having lengths that are greater or less than each other depending on the configurations and lengths of the first leaves 32, 42, second leaves 52, 62, first cover 80, and/or second cover 90.

As illustrated by block 206 of FIG. 15, the leaves 32, 42, 52, 62, 112, 122 and the covers 80, 90, 150 are packaged for shipping to a client, either as separate components, or pre-assembled into a first hinge portion 30, second hinge portion 50, and extension(s) 100. Because of the reduced length of the hinge leaves 32, 42, 52, 62, 112, 122 and the covers 80, 90, 150 the split hinge(s) 20 may be packaged (e.g., individually, or in multiple groups) in a size with lengths that are smaller than the packaging for typical continuous hinges. Due to the reduced size of the components (e.g., the reduced length) the product is easier to package (e.g., both in the packaging and the process for packaging), handle (e.g., movement before and/or after packaging to the required locations either manually or using standard automated processing machinery), transport (e.g., ground, air, and/or manual carrying), and deliver (e.g., to a job site, commercial, residential, or the like location).

Block 208 of FIG. 15, further illustrates that during installation an installer may operatively couple the first leaves 32, 42 to the first cover 80, operatively couple the second leaves 52, 62 to the second cover 90, and/or operatively couple the extension leaves 112, 122 to the extension cover 150. Alternatively, this may occur during the manufacturing process and/or during packaging. During assembly, as previously described herein, two heads 38, 48 or 58, 68 are located adjacent each other, such that the teeth 70 of the heads 38, 48, 58, 68, 118, 128 engage each other. Thereafter, a cover 80, 90, 150 slides over the heads 38, 48, 58, 68, 118, 128 of two adjacent heads 38, 48, 58, 68, 118, 128 in order to form the first hinge portion 30, the second hinge portion 50, and/or the extension hinge portion 100. Before installation of the first hinge portion 30, the second hinge portion 50, and/or the extension hinge portion 100 to a door or door frame, the installer may operatively couple the first hinge portion 30 and the second hinge portion 50. As previously discussed herein, the first hinge portion 30 may be operatively coupled to the second hinge portion 50 by sliding the first cover 80 over the second leaves 52, 62 of the second hinge portion 50. Alternatively, the second cover 90 may be slid over the first leaves 32, 42 of the first hinge portion 30. In sill other embodiments, a third cover may be slid over the first leaves 32, 42 of the first hinge portion 30 and over the second leaves 52, 62 of the second hinge portion. Alternatively, the installer may operatively couple the extension hinge portion 100 between the first hinge portion 30 and the second hinge portion 50. As such, the first hinge portion 30 may be operatively coupled to the extension hinge portion 100 by sliding the first cover 80 over the extension leaves 112, 122 of the extension portion 100, and sliding the extension cover 150 over the second leaves 52, 62 of the second hinge portion 50 (or vise versa). Alternatively the first hinge portion 30 and the second hinge portion 50 may be operatively coupled together as described above, and the extension portion 100 may be operatively coupled to an end of the first hinge portion 30 or the second hinge portion 50 by sliding the extension cover 150 over the first leaves 32, 42 or the second leaves 52. 62.

As illustrated by block 210 in FIG. 15, the installer operatively couples the assembled split hinge 20 to the door frame and/or a door through the use of one or more connectors (e.g., fasteners, such as screws, bolts, or the like, or any other type of connectors). By pre-assembling the first hinge portion 30 to the second hinge portion 50 (and in some cases the extension hinge portion 100) the assembled split hinge 20 is more easily assembled to a door and/or a door frame. That is, by first assembling the first hinge portion 30 to the second hinge portion 50 the split hinge 20 is aligned properly to allow the door to swing property when installed. Alternatively, if the separate portions of the split hinge were first assembled to the door and/or frame it may be difficult to properly align the first hinge portion 30 with the second hinge portion 50. By installing the hinge portions separately to the door and/or door frame the hinges may bind, become damaged, have increased friction, or the like, and thus, the door may not open smoothly. However, it should be understood that the present disclosure allows for the installation of the first hinge portion 30, the second hinge portion 50, and/or one or more extension portions 100 before pre-assembling the split hinge 20 (e.g., assembling each portion directly on a door and/or wall, with or without the use of an alignment tool).

It should be understood that while the present invention is described with respect to geared hinges, the present invention may also be used in accordance with continuous pin and barrel hinges. In these embodiments, two or more pins (e.g., first pin, second pin, or the like), like the covers previous described herein, may be used that have different pin lengths than the leaves lengths described herein.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "top," "bottom," "side," "distal," "proximal," "upper," "lower," "left," "right," "horizontal," "vertical," "upward," "downward", "first", "second", or other like terminology merely describe the configuration shown in the figures. The referenced components may be oriented in an orientation other than that shown in the drawings and the terminology, therefore, should be understood as encompassing such variations unless specified otherwise.

It will be understood that when an element is referred to as "operatively coupled" to another element, the elements can be formed integrally with each other, or may be formed separately and put together. Furthermore, "operatively coupled" can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of installing a modular door hinge to a door system, the method comprising:
- assembling a first hinge portion to a second hinge portion using a first cover, wherein the first hinge portion comprises:
  - two first leaves, each of the two first leaves comprising:
    - a first web; and
    - a first head with first teeth extending from the first web; and
  - the first cover operatively coupled to the two first leaves;
  - wherein the first cover has a first cover length that is greater than a first hinge length of the first hinge portion; and
- wherein the second hinge portion comprises:
  - two second leaves, each of the two second leaves comprising:
    - a second web; and
    - a second head with second teeth extending from the second web; and
  - a second cover operatively coupled to the two second leaves;
  - wherein the second cover has a second cover length that is less than a second hinge length of the second hinge portion; and
- wherein the first hinge portion is operatively coupled to the second hinge portion by operatively coupling a portion of the first cover to the two second leaves such that the portion of the first cover extends over the second head of each of the two second leaves;

assembling one of the two first leaves and one of the two second leaves to a door frame; and assembling another of the two first leaves and another of the two second leaves to a door, wherein after assembling the two first leaves and the two second leaves to the door frame and the door the modular door hinge is installed such that the first cover and the second cover are exposed.

2. The method of claim 1, wherein the two first leaves have first leaf lengths and the two second leaves have second leaf lengths.

3. The method of claim 2, wherein the first leaf lengths are greater than the second leaf lengths.

4. The method of claim 2, wherein the first leaf lengths are less than the second leaf lengths.

5. The method of claim 2, wherein the first leaf lengths are equal to the second leaf lengths.

6. The method of claim 1, wherein a first web length of the first web is less than a first head length of the first head, and a second web length of the second web is greater than a second head length of the second head.

7. The method of claim 1, wherein a first web length of the first web is greater than a first head length of the first head, and a second web length of the second web is less than a second head length of the second head.

8. The method of claim 1, wherein the first cover length is greater than the second cover length.

9. The method of claim 1, wherein the second cover length is greater than the first cover length.

10. The method of claim 1, wherein the first cover length is equal to the second cover length.

11. The method of claim 1, wherein the first hinge length and the second hinge length are less than or equal to 48 inches to allow for packaging within a package having a length less than or equal to 48 inches.

12. The method of claim 1, wherein the first hinge portion and the second hinge portion form the modular door hinge having a door hinge length of 83 inches.

13. The method of claim 1, further comprising:

assembling an extension hinge portion to the first hinge portion or the second hinge portion using an extension cover, wherein the extension hinge portion, comprising:

two extension leaves, each of the two extension leaves comprising:

an extension web; and an extension head extending from the extension web and having a longitudinal axis; and the extension cover operatively coupled to the two first leaves.

14. The method of claim 13, wherein the extension hinge portion has an extension hinge length of 12 inches.

15. The method of claim 13, wherein the first hinge length, the second hinge length, and an extension hinge length form the modular door hinge having a door hinge length of 95 inches.

16. The method of claim 13, wherein the extension cover has an extension cover length that is equal to an extension hinge length of the extension hinge portion.

17. The method of claim 13, wherein the extension cover has an extension cover length that is greater than an extension hinge length of the extension hinge portion.

18. The method of claim 13, wherein the extension cover has an extension cover length that is less than an extension hinge length of the extension hinge portion.

19. The method of claim 13, wherein the first hinge portion and the second hinge portion are coupled to each other only through the first cover.

20. The method of claim 13, wherein the extension portion is assembled between the first hinge portion and the second hinge portion.

* * * * *